Jan. 1, 1935.                    R. LINN                      1,986,274
                             AXLE JOURNAL BEARING
                             Filed Oct. 9, 1933              2 Sheets-Sheet 1
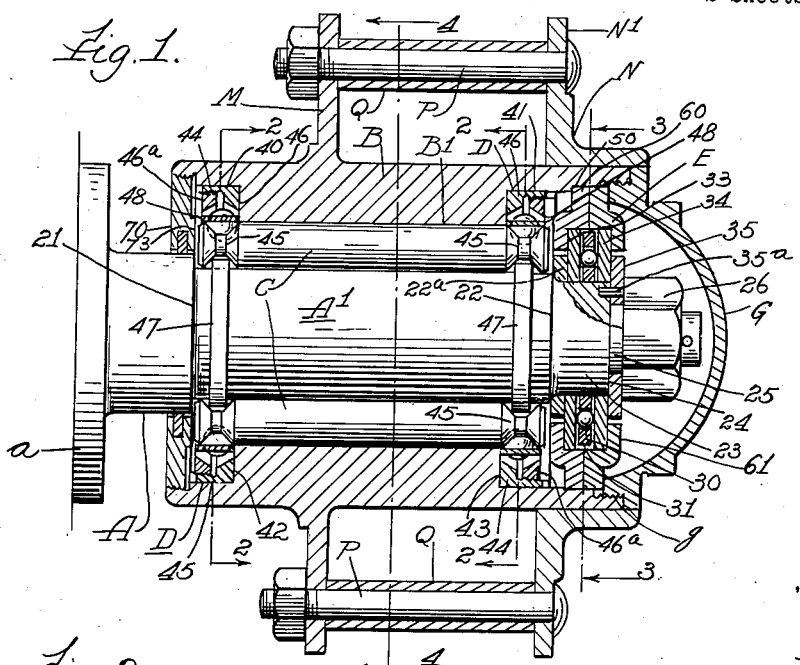
Inventor
Robert Linn
by Burton Burton
his Attorneys.

Jan. 1, 1935.  R. LINN  1,986,274
AXLE JOURNAL BEARING
Filed Oct. 9, 1933  2 Sheets-Sheet 2
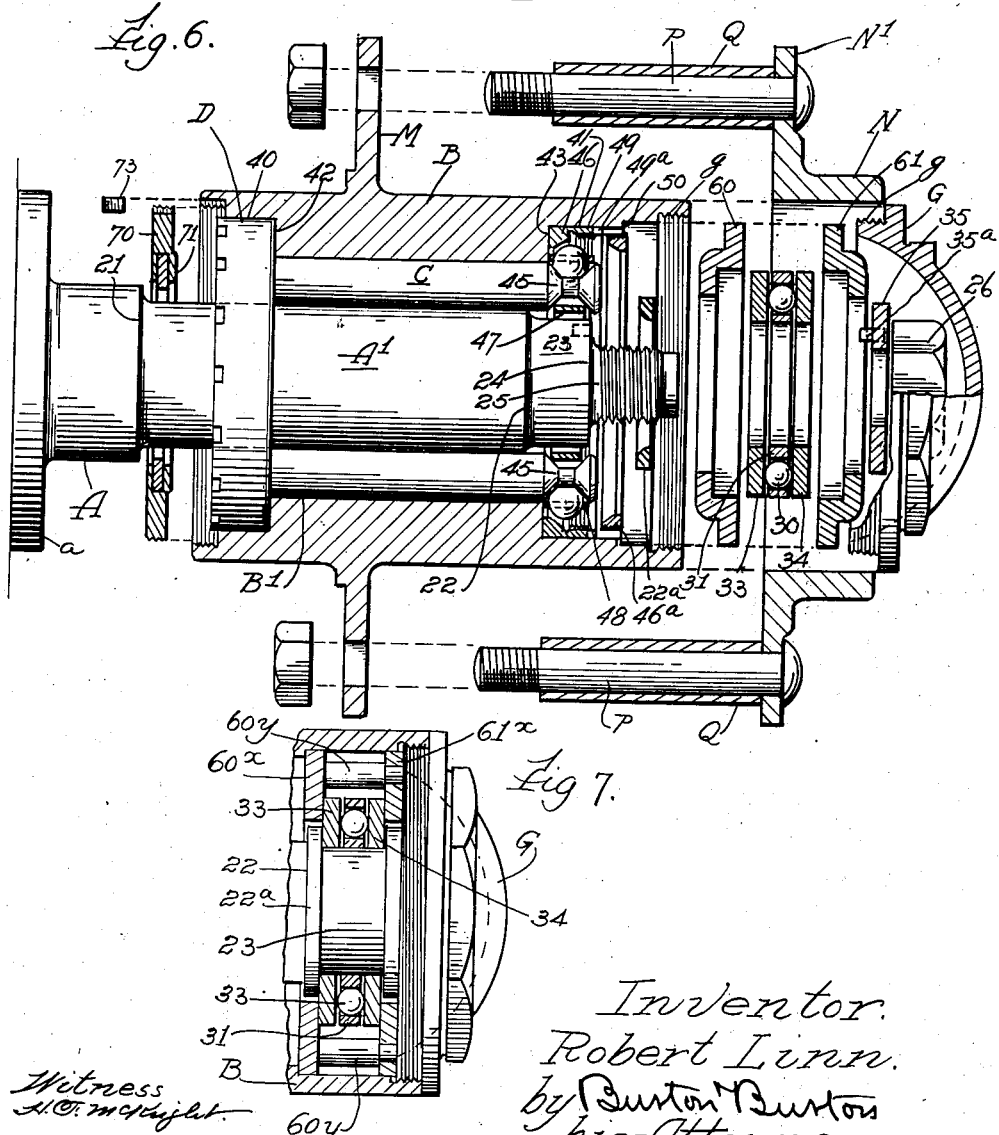
Inventor.
Robert Linn.
by Burton Burton
his Attorneys.

Patented Jan. 1, 1935

1,986,274

UNITED STATES PATENT OFFICE 1,986,274

AXLE JOURNAL BEARING

Robert Linn, Chicago, Ill.; Lawrence W. Whitmer, administrator of said Robert Linn, deceased, assignor, by mesne assignments, to Eureka Machinery Company (Limited) Trust Estate, Chicago, Ill.

Application October 9, 1933, Serial No. 692,859

7 Claims. (Cl. 308—206)

The purpose of this invention is to provide an improved form and construction of a vehicle axle bearing, as for a railway car truck or road vehicle having roller bearings for the axle or journal, and ball bearings for receiving the end thrust. The invention consists in the elements and features of construction shown and described as indicated in the claims.

In the drawings:

Figure 1 is a vertical section, axial with respect to the axle or journal, of the hub of a vehicle wheel constructed in accordance with this invention.

Figure 2 is a section at either of the lines 2—2 on Figure 1.

Figure 3 is a section at the line 3—3 on Figure 1.

Figure 4 is a section at the line 4—4 on Figure 1.

Figure 5 is a section at the line 5—5 on Figure 1.

Figure 6 is a dissected partly sectional view showing in side elevation the several parts which are assembled on the axle, as seen in Figure 1, the journal bearing member or hub body being shown in section as in Figure 1.

Figure 7 is an assembled view of a modified form of the part of the structure shown in the dissected part of Figure 6.

Referring to the drawings:

A is the axle or journal element which is shown as a terminal of a fixed or hub axle which might be understood to be made fast to the frame structure of the vehicle by means of the flange, $a$. But the invention is not to be understood as concerned with the character or mounting of the journal member as to whether it is fixed for carrying a rotatable wheel or rotatable in a fixed journal bearing, or whether both axle and wheel are rotatable with respect to each other and with respect to the vehicle frame structure.

The axle, A, comprises the journal proper indicated at $A^1$, extending within the journal bearing member indicated in entirety at B, and having the journal bearing afforded by bearing rollers, C, seated for rolling on the journal, $A^1$, and on the inner journal bearing surface, $B^1$, of the journal bearing member, B. The rollers, C, are assembled and retained in a circular series encompassing the journal by anti-friction ball assemblies indicated in entirety at D, and hereinafter more particularly described. Provision for end thrust of the journal member is made by anti-friction ball assembly indicated in entirety at E, and hereinafter described in detail, said ball assembly being carried on the axle at the outer end portion thereof beyond the roller bearing portion, $A^1$, and stopped longitudinally of the axle and stopped also longitudinally of the journal bearing member, B, by means fixed with respect to said journal bearing member hereinafter particularly described.

The purpose of the construction as having the ball assembly stopped longitudinally of the axle and also stopped longitudinally of the journal bearing member is to adapt the ball assembly to take the endwise thrust of the axle or journal in both directions, dispensing with a second ball assembly which would otherwise be necessary at the other end of the roller seating portion of the journal.

Referring to the drawings in detail: The axle or journal member is formed with an outwardly facing annular shoulder, 21, which may be considered as bounding the roller-seating portion of the journal constituting the journal proper, which extends of uniform diameter from said shoulder, 21, the full length of the rollers; and at the outer limit of that portion the journal member is reduced in diameter forming a second outwardly facing shoulder, 22, and extending outwardly from said second shoulder a uniformly diametered portion, 23, which seats a narrow collar or washer, $22^a$, and beyond the thickness of said washer constitutes a seat and journal for the ball assembly seat the journal member is further reduced in diameter forming a third outwardly facing shoulder, 24, and a narrow or short uniformly diametered seat, 25, therebeyond, for seating a narrow collar, 35, which is stopped against the shoulder, 24, and engaged therewith for rotation with the journal by a pin, $35^a$, engaging a recess or notch in the shoulder, 24, and which is dimensioned as to its outer diameter for lapping over the ball assembly, E, to retain the latter on the seat, 23, against longitudinal displacement. The terminal portion of the journal member beyond the seat, 25, is threaded to receive a nut, 26, for retaining the collar, 35, on the seat, 25, as described.

The ball assembly, E, comprises a circular system of balls, 30, mounted on a ball-retaining and spacing ring, 31, of familiar construction in that it has holes suitably dimensioned and spaced apart circumferentially for accommodating the balls and spacing them in circumferential order, the ring being less in thickness than the diameter of the balls, so that the balls may protrude at either or both sides of the ring for their anti-friction function in rolling contact with the track plates, 33 and 34, between which the ball-spacing ring and ball system therein are embraced. The aggregate dimension longitudinally of the journal of the ball assembly is just sensibly less than the extent of the seat, 23, outwardly from the washer, 22ª, so that the ball assembly stopped between the washer, 22a,— which is stopped against the shoulder, 22,— and the collar, 35, is not clamped for clamping the balls of the ball system between the track plates, but on the contrary all parts of the ball assembly are free to move in response to the rotative movement of the journal relatively to the journal bearing member.

The journal bearing member, B, is shown as a wheel hub with an exterior annular flange, M, and furnished with an exterior collar or sleeve, N, having an annular flange, N¹, mating and facing the flange, M, and equipped with bolts, P, and spacing sleeves, Q, for clamping to the hub of a demountable wheel. But it may be understood that the present invention is not concerned with these features except in the general way that the invention may be embodied in a wheel hub construction as suggested by the wheel hub features without departing from its primary purpose and intent.

This journal bearing member, B, is dimensioned as to its inner diameter at the major part of its length for accommodating the roller system made up of the rollers, C, with enlarged inner diameter at the opposite end portions, as seen at 40, 41, and annular transaxial shoulders, 42 and 43, for seating on said shoulders respectively the ball assemblies, D, D. Each of these ball assemblies comprises a circular system of balls, 44, seated individually between the consecutive rollers of the system and in the annular grooves, 45, of the rollers with a spacing ring, 48, having holes for positioning the balls properly spaced circumferentially for thus seating between and on the rollers and cooperating encompassing rings, 46 and 46ª, formed for screwing together to embrace the ball system and at their inner circumference formed to afford proper tracks for the rolling of the balls. As may be understood from the showing of the rings, 46 and 46ª, in Figures 1 and 5, the outer ring, 46, is formed with a peripherally ratchet-toothed flange, 49, cooperating with a spring pawl, 49ª, mounted on the outer face of the ring, 46.

Thus the two rings are screwed together for holding the ball system in proper relation to the rollers and will be safe against liability to become unscrewed.

The roller bearing as described is rendered substantially frictionless by having the rollers individually furnished with ball bearings as described, with the balls seated for rolling engagement with the rollers and also on the ball track of the journal bearing member, B, which is formed by the coupled rings, 46, 46ª. And for adapting the balls to thus roll without friction, that is, without slipping at their seating either on their inner track on the rollers, or on their outer track on the journal bearing member track, 46, 46ª, the parts are dimensioned in respect to the diameter of the journal member, A¹, diameter of the rollers, C, diameter of the balls, 44, and angle of the roller grooves, 45, so as to make the circle of the balls on which they contact the sloping sides of the grooves, equal in radius to that of the circle on said sloping sides of the grooves at which the balls track, and also equal in radius to the circle on which the balls track on the sloping sides of the rings, 46, 46ª, which constitute their outer track on the roller bearing member.

This feature consisting both in their inner seat on the rollers and their outer seat on the journal bearing member, may be stated as consisting in equality of radius of the pitch line between the balls and rollers, and the radius of the pitch line between the balls and their outer track. Such equality of pitch line radii is obtained by dimensioning the parts substantially as shown in the drawings.

An important feature of the construction illustrated in the drawings consists in a ring, 47, dimensioned as to inner diameter for slide fit on the journal part, A¹, and as to width and thickness for being accommodated in the grooves of the roller without necessarily contacting the sloping sides of the grooves when the rollers are in rolling contact with the journal. The reason for providing the ball assemblies with the rings, 47, is that by reason of the slight freedom of the roller assembly and corresponding freedom of the ball assembly, which is necessary to avoid binding the rollers in contact which would tend to defeat the possibility of rolling without friction, in the absence of the journal the rollers at the upper side of the journal space tend to sag into that space so that the ends of the sagging rollers are presented in the path of insertion of the journal into the journal bearing, which renders it difficult to introduce the journal into the bearing. This difficulty is avoided by the presence of the rings, 47, which, as stated, have their inner diameters such as to make them slidable on the journal, so that they present an unobstructed guideway for entering the journal; and when the journal is in place and the rollers are all seated in rolling contact with the journal, the rings, 47, riding idly on the journal, are out of contact with the sides of the grooves, except as they may oscillate slidingly on the journal into and out of bare touch at one lateral edge or the other with one side or the other of the grooves, such temporary touch being without sensible pressure because of the free sliding of the rings on the journal.

At the outer side or end of the journal bearing member, B, it is formed with its inner diameter further enlarged beyond the diameter which accommodates the ball assemblies to form a slight outwardly facing annular shoulder, 50, for seating a ball-assembly-retaining means consisting, in the form shown in Figure 1, of a pair of annular elements, 60, 61, which may be named collars or rings, which as an assembly are stopped at the outer circumferential margin on the shoulder, 50, and at the inner circumferential margin of both rings lapped on the outer circumferential margin of the track plates, 33, 34, of the ball assembly, means being provided, as hereinafter described, for holding the two rings, 60, 61, together and as an assembly firmly bound against the shoulder, 50.

To avoid possibility of clamping the ball assembly between these collars, 60, 61, which would tend to defeat the anti-friction function of the ball assembly, the collars are formed to provide means for positively and unchangeably spacing from each other their said inner circumferential margins by which the track plates 33 and 34 are engaged as shown in Figure 1. This positive spacing apart of the track-plate-engaging margins is effected by forming at least one of said collars,—and preferably as shown in Figure 1, both of them,—with a rabbet at the inner circumferential margin, in which rabbet the ball assembly is accommodated without clamping when the collars are held close together at their outer unrabbeted circumferential margins.

The modification of the rabbeted construction avoiding rabbets is shown in Figure 7 consisting in making both the collars, 60, 61, in the form of plane flat rings, 60$^x$ and 61$^x$, and providing one of them with three or more angularly spaced studs or bosses, 60$^y$, projecting toward one or the other of the flat rings, the length of the studs or bosses being substantially equal to, or barely sensibly greater than the total dimension of the ball assembly, so that the rings, 60$^x$ and 61$^x$, are spaced apart sufficiently to accommodate the ball assembly without clamping when the two rings are held together as closely as permitted by the bosses.

In either of the forms described, the ball-assembly-retaining means is bound firmly against the shoulder, 50, by a cap member, G, screwed into the interiorly threaded end of the journal bearing member, as seen at g. At the inner end of the journal bearing member, B, there is provided an annular closure member, 70, whose central aperture is somewhat greater in diameter than the axle member at the plane of said closure member, which is back of the shoulder, 21. And at the inner face of this annular closure member it is formed with a slightly inwardly protruding annular boss, 71, whose outer diameter is just perceptibly less than the inner diameter of the outer-side-member, 61, of the ball-retaining element of the inner end ball assembly, D; so that said annular boss may be encountered by the ends of the rollers in the slight possible axial oscillation of the roller system in which the end thrust of the journal is experienced alternately in opposite directions. In order that the annular boss may be accurately positioned for encounter of the rollers as described to avoid any greater oscillation of the roller system than consistent with proper antifrictional rolling cooperation of the balls with the rollers, and to permit such proper range of oscillation, the closure member is arranged to be screwed into the end of the journal bearing member an amount predetermined by careful observation of a competent mechanic in the assembly of the construction at the factory of production; and when the proper adjustment is determined, cooperating key seats in the outer circumferential periphery of the closure and the inner threaded circumferential periphery of the terminal flange of the journal bearing member is made by drilling the two parts at their interlocking threaded circumferences for receiving a key pin, 73, which may be a screw, the drilled key seat being threaded for receiving such screw key. It will be observed that due to the inner diameter of the annular closure member being greater than the diameter of the axle at the transaxial plane of said closure member, the axle has no bearing on the closure member.

Upon considering the construction as above described, it may be seen that I have produced a journal bearing adapted for railway car axles or road vehicle wheels, and the like, of which all the parts are of simple form easily and economically manufactured, and in which end thrust in both directions is taken by a single system of balls constituting a substantially frictionless end thrust bearing which is accessible at the outer end of the axle and outer side of the wheel, and of which all the parts cooperating for end thrust and relative rotation are enclosed in a cavity of the journal bearing member which is sealed (by the cap, G,) so that it is adapted to serve as a lubricant chamber in which all the cooperating relatively rotatable parts may be kept immersed in lubricant.

I claim:

1. A wheel hub containing a journal bearing for a journal carried by an axle on which the wheel is to be demountably mounted, the journal bearing comprising a circular system of bearing rollers, and the journal being dimensioned for insertion endwise through said roller system and being seated therein; a ball bearing for taking the endwise thrust of the journal consisting of a circular system of balls and a pair of annular track plates embracing the system in entirety, forming with said balls a ball bearing assembly, the journal having its outer end portion dimensioned for receiving said assembly and having a shoulder for stopping said assembly axially; means for retaining said assembly in said stopped position on the journal, the journal bearing having an enlargement at the outer end portion in the zone of the mounting of the ball bearing assembly on the journal, said enlargement forming a stop shoulder encompassing the journal and the ball bearing assembly; an annular member mounted in said enlargement dimensioned as to inner diameter for lapping over the circumferential margin of the outer plate of the ball bearing assembly; whereby when the ball bearing assembly is secured on the journal by said retaining means and said annular member is mounted in said enlargement and stopped on said shoulder the journal is locked against endwise withdrawal from the journal bearing, and a cap screwed into the enlargement of the journal outside said annular member for locking the latter in the journal bearing.

2. An anti-friction roller bearing construction comprising in combination with a journal and a journal bearing member, a roller assembly comprising a circular system of rollers with ball assemblies at its opposite ends consisting each of annular ball-retaining track members encompassing the roller system, and a circular ball system carried in the ball-retaining tracks respectively for seating the rollers of the roller system at their opposite ends, the journal bearing member being formed, as by counterbores, at its opposite ends with outwardly facing annular shoulders dimensioned for seating the ball track elements of the roller assembly, means locking the ball track-retaining members in the journal bearing member consisting of a cap screwed onto the journal bearing member enclosing the end of the journal and the ball system locking means; whereby the cavity of the journal bearing member which accommodates the ball system is adapted to serve as a lubricant chamber.

3. A roller bearing construction comprising in combination with a journal and a journal bearing member, a roller system encompassing the journal within the journal bearing member, the rollers of the system having each toward each end an annular encompassing groove of which the sides are radially inwardly converging in axial section of the roller; a system of balls at each end of the roller system having the balls lodged individually between consecutive rollers seating in said grooves of the rollers, the journal bearing member being provided with circumferentially grooved tracks for the ball systems respectively encompassing the same, the grooves of said tracks having their sides converging outwardly radially in axial section of the journal bearing for seating the balls of the respective systems on the converging sides of said grooves, the parts being dimensioned to render the radius of the circle on the balls at which they are seated for rolling on their inner tracks on the rollers equal to the radius of the circle on the balls at which they are seated for rolling in their outer track in the groove of the journal bearing member.

4. A roller bearing construction comprising in combination with a journal and a journal bearing member, a roller system encompassing the journal within the journal bearing member, the rollers of the system having each toward each end an annular encompassing groove of which the sides are radially inwardly converging in axial section of the roller; a system of balls at each end of the roller system having the balls lodged individually between consecutive rollers seating in said grooves of the rollers, the journal bearing member being provided with circumferentially grooved tracks for the ball systems respectively encompassing the same, the grooves of said tracks having their sides converging outwardly radially in axial section of the journal bearing for seating the balls of the respective systems on the converging sides of said grooves, the parts being dimensioned to render the radius of the circle on the balls at which they are seated for rolling on their inner track on the rollers equal to the radius of the roller at the transverse plane at which the balls are seated in the grooves of the rollers which form the inner track of the balls.

5. A roller bearing construction comprising in combination with a journal and a journal bearing member, a roller system encompassing the journal within the journal bearing member, the rollers of the system having each toward each end an annular encompassing groove of which the sides are radially inwardly converging in axial section of the roller; a system of balls at each end of the roller system having the balls lodged individually between consecutive rollers seating in said grooves of the rollers, the journal bearing member being provided with circumferentially grooved tracks for the ball systems respectively encompassing the same, the grooves of said tracks having their sides converging outwardly radially in axial section of the journal bearing for seating the balls of the respective systems on the converging sides of said grooves, the parts being dimensioned to render the radius of the circle on the balls at which they seat for rolling on their inner tracks on the rollers, and the radius of the circle at which they seat for rolling on their outer track in the journal bearing member being equal, and equal to the radius of the rollers at the transverse plane at which the balls are seated in the groove of the rollers which forms the inner track of the balls.

6. In combination with a journal member and a journal bearing member, an anti-friction roller system interposed between the journal and the journal bearing member, and an anti-friction ball system of which the individual balls are interposed between circularly consecutive rollers of the roller system and also between said rollers and the roller-system-encompassing journal bearing, the journal member being reduced in diameter over the portion of its length occupied by the roller system forming a stop shoulder at the inner end of the roller system, and a closure for the journal bearing at the inner end consisting of a ring arranged to be screwed into the inner end of the journal bearing member and dimensioned as to its inner diameter for loosely encompassing the journal at the unreduced part of the latter inward from said stop shoulder, said closure ring being reduced in thickness on its inner face at an outer circumferential part of said face to form at an inner circumferential part thereof an annular boss facing the inner ends of the rollers for encounter with the rollers to limit their endwise play with respect to the ball system and the journal bearing, and means for securing said screwed-in ring at position to which it may be adjusted by screwing it into the journal bearing member.

7. In combination with a journal and a journal bearing member, an anti-friction roller system interposed between the journal and the journal bearing member, and an anti-friction ball system of which the individual balls are interposed between the circularly consecutive rollers and also between said rollers and the journal bearing member, the rollers of the roller system having each a circumferentially encompassing groove for seating the balls between the rollers and the journal bearing member, and a ring fitted slidingly on the journal and dimensioned as to interior diameter and thickness in axial direction for engaging the encompassing grooves of the rollers when the latter are operatively assembled with interposed balls in the journal bearing member.

ROBERT LINN.